S. D. IRWIN.
METHOD OF REPAIRING ALUMINUM CASTINGS.
APPLICATION FILED NOV. 26, 1918.
1,309,033.
Patented July 8, 1919.
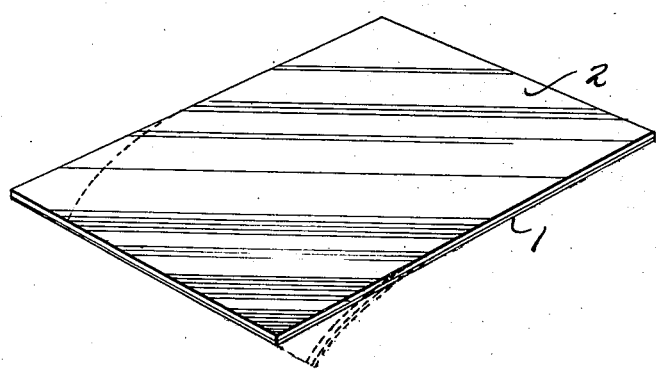
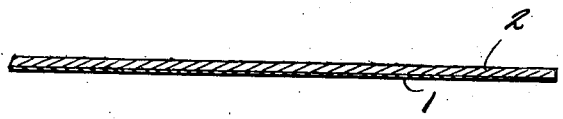
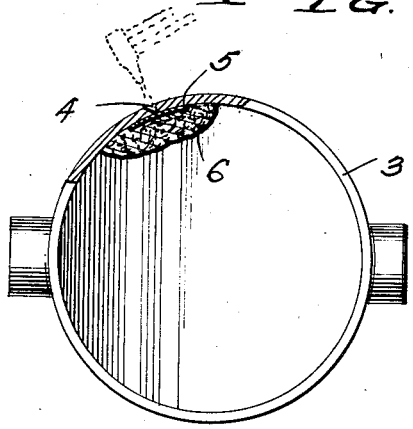
Inventor
Samuel D. Irwin

UNITED STATES PATENT OFFICE.

SAMUEL D. IRWIN, OF FLOYDADA, TEXAS.

METHOD OF REPAIRING ALUMINUM CASTINGS.

1,309,033.   Specification of Letters Patent.   Patented July 8, 1919.

Application filed November 26, 1918. Serial No. 264,250.

*To all whom it may concern:*

Be it known that I, SAMUEL D. IRWIN, a citizen of the United States, residing at Floydada, in the county of Floyd and State of Texas, have invented certain new and useful Improvements in Methods of Repairing Aluminum Castings, of which the following is a specification.

The present invention has for its object the repairing of fractured aluminum castings, whereby the same are made equal to new both as to service and appearance.

In accordance with the present invention a composite plate is provided and is utilized as means for sustaining the metal when reduced to a molten state by the application of an intense flame, said plate assuring a smooth surface to the weld upon one side.

The drawing illustrates a preferred embodiment of the invention; however, it is to be understood that in adapting the same to meet different conditions, various changes in the form, proportion, and minor details of construction may be resorted to without departing from the nature of the invention as claimed hereinafter.

Referring to the accompanying drawing,

Figure 1 is a perspective view of a welding plate embodying the invention.

Fig. 2 is a sectional view of the plate.

Fig. 3 is a detail view illustrating the method.

Corresponding and like parts are referred to in the following description and indicated in the several views of the drawing by like reference characters.

In accordance with the invention a composite plate is provided, the same consisting of a base or foundation 1 and a layer 2 of alloying metal to combine with the aluminum during the process of welding. The base or foundation 1 may consist of a plate of iron, copper, or other metal having a relatively high fusing point. The layer 2 applied to one side of the base or foundation plate 1 is relatively thick and consists of tin, zinc, antimony or a combination of analogous metals fusing at a relatively low point. The layer 2 constitutes an alloying bed which combines with the aluminum, thereby facilitating the welding process. The base plate 1 acts as a carrier for the alloying bed 2 and sustains the metal when fused.

In accordance with this invention the method is carried out in the following manner:—Let 3 represent an aluminum casting having a fracture 4. As a preliminary step the outer portion of the fracture is enlarged to facilitate the application of the flame. This step is not essential although desirable. A piece of the welding plate sufficient to amply cover the fracture is applied to the inner side of the casting and conformed to the surface thereof, as indicated at 5. This welding piece 5 is placed with the alloying bed in contact with the inner surface of the casting and the plate is conformed to the inner surface of the casting by pressure or blows of a hammer delivered thereon or in any way found most convenient, it being essential that the welding plate be made to fit close against the inner surface of the casting and extend some distance on each side of the fracture. After the welding plate has been fitted to the casting a backing 6 of asbestos, or other refractory material is applied to the plate and casting to hold the welding plate in position. The backing 6 is applied preferably in a plastic state and is retained in position either by adhesion or by the application of suitable bracing means. After the casting has thus been prepared an intense flame such as an oxyacetylene jet is directed against the fracture 4, thereby causing the alloying bed 2 to fuse and the bed thus fusing amalgamates with the aluminum and causes it to fuse, whereby the parts bordering upon the fracture 4 are caused to unite in a manner well understood in the process of welding. A feeder stick is utilized to flush the joint so that the outer surface may come flush with the outer surface of the casting and also to provide sufficient metal at the weld. The process is now completed and after the casting has cooled sufficiently the backing 6 is removed and the base or foundation plate 1 peeled or stripped off thereby leaving the inner surface of the casting perfectly smooth.

Having thus fully described my invention what I claim as new and desire to secure by Letters Patent is:—

The herein described method of welding aluminum castings which consists in applying a welding plate to a side of the article to be welded, said plate comprising a base and an alloying bed, the plate being applied with the alloying bed in contact with the surface of the article to be welded and made to conform thereto, then applying a backing to the welding plate so as to overlap the welding plate and a portion of the article, then applying an intense flame to the joint to fuse the alloying bed and parts of the aluminum bordering upon the joint, then allowing the article to cool and finally removing the backing and stripping off the base.

In testimony whereof I affix my signature in presence of two witnesses.

SAMUEL D. IRWIN.

Witnesses:
   MAT NIX,
   M. L. CHILDRESS.